3,049,609
ARC WELDING SYSTEM
Rawlins E. Purkhiser, Springfield, and William F. Iceland, Metuchen, N.J., assignors to Air Reduction Company, Incorporated, New York, N.Y., a corporation of New York
Filed Nov. 4, 1960, Ser. No. 67,219
2 Claims. (Cl. 219—135)

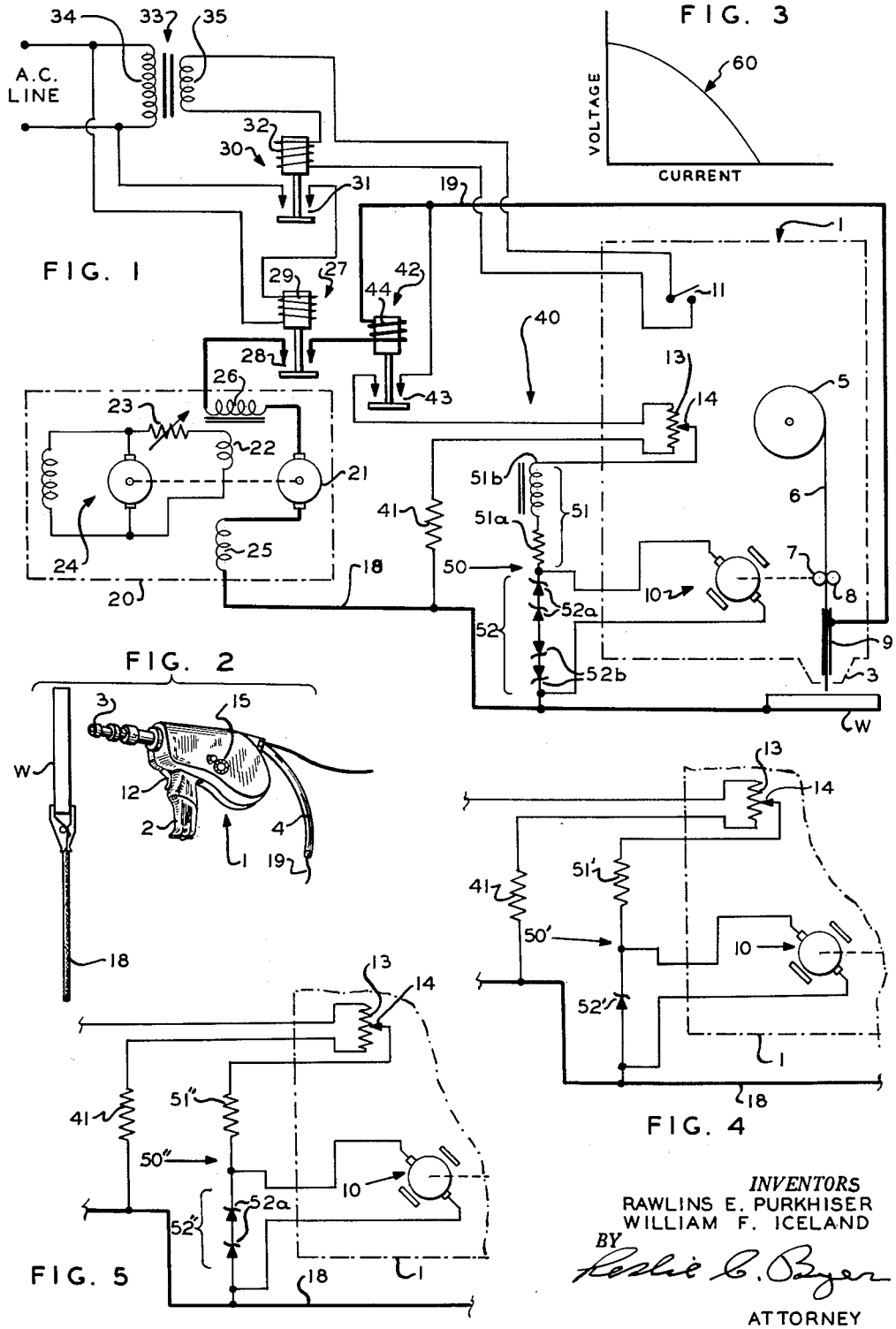

This invention relates to a feed-motor protection system for use in arc welding apparatus of the type comprising a hand-manipulated gun out of which a wire electrode is automatically fed to be projected in minutely subdivided form toward a work electrode in an arc between the electrodes. Such apparatus may, for example, be of the general type shown in U.S. Patent No. 2,504,868, issued on application of Albert Muller et al., to the assignee of the present invention.

In such apparatus it has been found frequently desirable (although it is not shown in that patent) to connect an electric motor, which is present within the gun and which serves the purpose of feeding the wire electrode, electrically in shunt relationship to the arc path. The motor being one whose speed varies with applied voltage, this connection results in an automatic regulation of feed speed in predetermined relationship to the arc conditions which, for reasons not themselves involved in the present invention, is a favorable regulation. The present invention contemplates such connection of the motor.

In such apparatus there is very frequently used a source of arc current having a drooping voltage/current characteristic, i.e., a source whose output voltage droops with increasing current drain. The present invention, although not in all aspects limited thereto, has especial utility in and will be described primarily in connection with apparatus utilizing such a source.

The present invention is directed to the solution of certain problems which arise in connection with such apparatus.

In starting the arc with such apparatus the gun, with the arc current circuit completed but the motor circuit not yet completed, is manipulated to bring the wire electrode into momentary contact with the work electrode, and upon the cessation of this momentary contact the arc should strike. With any reasonable degree of dexterity in manipulation of the gun the process, frequently termed "scratch starting," is entirely dependable; it is, however, possible so clumsily to manipulate the gun that the starting may fail to occur. The cessation of the contact without the establishment of the arc will be attended by a sudden rise in voltage between the electrodes, due not merely to the shift of the source voltage to the highest value on its characteristic but also, if the source be characterized by appreciable inductance as it almost always is, to the development of a superimposed transient voltage. Upon the establishment of the momentary contact the motor circuit will have been completed, so that it is still completed at the time of the cessation of the contact; the motor circuit being across the arc path, there will be suddenly impressed across it the aggregate of the highest available source voltage and the transient.

In the use of the apparatus after the starting of the arc it is intended that the operator shall maintain the feeding wire electrode at a distance from the work electrode suitable for efficient welding action, and it is not expected that he will engage in manipulations of the gun which will result in large increases of the distance, i.e., of the arc length. Unfortunately, however, operators sometimes violate this precept; the resulting large increase of arc length will very substantially raise the voltage across the arc path. The motor circuit being of course completed, this raised voltage will of course be impressed across it.

The case just discussed may be worse if the lengthening of the arc be abrupt and the source be characterized by appreciable inductance, for then a transient may be superimposed on the increased source voltage, and will add to the voltage appearing across the motor circuit.

In the gun of such apparatus it is common to provide a "trigger" switch for operation by the finger of the operator, which he will throw to prepare for starting of the arc, which he must keep thrown to maintain the arc, and which he ought to release as the exclusive manner of extinguishing the arc. Again, however, precept is frequently violated and it is actually quite common for the operator, while maintaining the trigger switch thrown, to extinguish the arc by simply withdrawing the gun to a distance from the work electrode so great that the arc cannot be maintained, this being frequently termed "snapping out" the arc. As in the case of unsuccessful attempt at scratch starting discussed above, not only will the voltage across the arc path be raised to the maximum available from the source but also, if the source be characterized by appreciable inductance, there will be superimposed a substantial transient voltage, and again the aggregate of the maximum available source voltage and the transient will be impressed across the motor circuit.

It is of course possible to design and build a motor which will withstand much if not all of the abuse occasioned, as outlined above, by improvident gun manipulation, but this leads to cost, inefficiency, and bulk and weight in a portion of the apparatus (the gun) which rather obviously should be as small and light as reasonably possible.

The present invention has for an object the proofing of the motor against damage by improvident manipulation of the gun by the operator. A more specific object is the proofing of the motor against damage by the voltage rises and transients discussed above. An allied object is to make possible the use of a less expensive, more efficient, more compact and lighter motor than it has heretofore been possible to use in the gun with any assurance of durability.

Other and allied objects will more fully appear from the following specification and the appended claims.

As hereinafter more fully described, the invention contemplates the placement of the motor in the desired shunt relationship to the arc path not in the simple manner heretofore used, but through the medium of a special potentiometric system suitably incorporating an impedance portion and a zener diode portion which diverts to the impedance portion the excesses of voltage, both transient and other, which would otherwise be impressed across the motor.

In the description of our invention hereinafter set forth reference is made to the accompanying drawing, in which:

FIGURE 1 is a schematic diagram of arc welding apparatus of the type first above referred to, in which our invention has been embodied in one form;

FIGURE 2 is an elevational perspective view of a gun such as may form a portion of the apparatus of FIGURE 1;

FIGURE 3 is a curve showing, for the source of arc current, a typical drooping voltage/current characteristic;

FIGURE 4 is a fractional schematic diagram, intended for optional substitution for the analogous portion of FIGURE 1, showing an alternative embodiment of our invention; and FIGURE 5 is a diagram of the same nature as FIGURE 4 but showing a still further alternative embodiment.

Reference being had to FIGURE 1, there will be seen in dash-dot lines an enclosure schematically representing the confines of the gun 1. Within this enclosure appears a reel 5 on which there is wound up a supply of the wire electrode 6, that wire passing from reel 5 between a pair of rollers one of which is a driving roller 7, and the other of which is a driven roller 8 biased by suitable means (not shown) to hold it against the wire 6 and that wire against the driving roller 7. From the pair of rollers the wire will be seen to pass on to and through a schematically shown outlet guide tube 9, suitable portions of which (end portions, for example) may serve to make dependable electrical contact with the wire for the purpose of conduction of the heavy welding current to the wire. The driving roller 7 may be driven through any suitable coupling means (such, for example, as gearing, not shown) by the motor 10; this may desirably be of the permanent-magnet variety and may rotate at a speed which is a function of the voltage applied to its armature winding. It will be understood that when the motor 10 is operated the wire electrode 6 will be fed, downwardly as seen in FIGURE 1, through the outlet guide tube 9.

Also mounted within the gun and to be seen in the schematic enclosure 1 in FIGURE 1 are a normally open switch 11 and a conventional potentiometer 13. The switch 11 is the trigger switch of which mention has already been made; the function of the potentiometer 13 will be later apparent.

FIGURE 2 is an elevational perspective view of the gun 1, and is of interest in showing the handle 2, the trigger 12 by which the trigger switch 11 is operated, and a knob 15 by which the movable contact 14 of the conventional potentiometer 13 mentioned above may be adjusted. FIGURE 2 also shows a nozzle 3; this is coaxial with the outlet guide tube 9 mentioned above, so that the wire electrode 6 being fed through that tube emerges through the nozzle. It will be understood that when the apparatus is in operation the nozzle will be pointed at and held at a suitable short distance from the work electrode, designated as W in FIGURES 1 and 2; the arc takes place between the tip of the wire electrode 6 and the work electrode W. Although the wire is in constant axial motion the arc, transforming the wire into minute droplets which it carries to the work electrode, maintains the end of the wire electrode, considered as a solid entity, at an essentially fixed point a little beyond (in FIGURE 1, wherein the nozzle is schematically shown, below) the end of the nozzle 3.

The nozzle is materially larger in internal diameter than the diameter of the wire electrode 6, and serves to discharge therearound a shielding gas (such as argon, helium or a mixture of the two) which is supplied to the gun through a suitable hose 4 and is conducted within the gun to the nozzle by means not necessary to show. The function of the gas is the very useful one of excluding oxygen and other reactive components of the air from the weld area during the welding process; this is of especial importance in the welding of aluminum and its alloys, to which apparatus of the type herein dealt with is especially, though in no sense exclusively, adapted. This function is not, however, peculiarly related to the present invention, and for that reason the gas-supplying elements have not been indicated in FIGURE 1 other than for the schematic illustration of the nozzle 3.

The circuitry associated with the gun may now be described, with reference especially to FIGURE 1. Shown therein in heavy lines are the welding cable or conductor 18 connecting the work electrode W to one terminal, and the welding cable or conductor 19 connecting the outlet guide tube 9 (and thus the wire electrode 6) to the other terminal, of a source 20 of welding current. (These cables also appear in FIGURE 2, wherein it will be seen that the welding cable 19 may conveniently be disposed within the gas-conducting hose 4.)

As shown in FIGURE 1, the source 20 may comprise a generator 21 having a field winding 22 energized under the control of a rheostat 23, by a separate shunt-field exciter 24 whose shaft is coupled to or common with that of the generator 21, the generator being provided with the series differential field winding 25, and having in series therewith an actual or equivalent inductance 26. This source 20, together with a motive-power source such as an electric motor or gasoline engine (not shown), may constitute what is frequently termed a "welding machine." The source as described above has a drooping output voltage/current characteristic such as that shown as curve 60 in FIGURE 3; further, it is characterized by appreciable impedance as seen looking back into the source.

It will be understood that in the case of almost any source there is usually provided some control element adjustable to alter within limits the quantitative aspects of the output characteristic (the rheostat 23 being such a control element in the source particularly illustrated), but that the adjustment of such control element will not ordinarily alter the qualitative nature of that characteristic, e.g., in the particularly illustrated source, the drooping nature of the characteristic. The nature of the quantitative alteration may be approximately described as a shift of the main portion of the curve either upwardly and rightwardly, or downwardly and leftwardly, as arranged in FIGURE 3 or, in the case of certain alternative sources, as more nearly a pivoting of the curve about its intercept with the voltage axis. Curve 60, then, will be understood to portray the output characteristic under the conditions of a particular, but of course typical, adjustment of the source control element.

In order to exert, on the heavy current which is to flow in the welding circuit, an on-off control under the command of the trigger switch 11, it is common to insert in the welding conductor 19 the normally open contacts 28 of a weld contactor relay 27, of which the coil 29 is to be commanded by the trigger switch. For both voltage and power reasons, however, it is preferable not to connect the trigger switch in series directly with the coil 29; it is common instead to connect the trigger switch in series with the coil 32 of a control relay 30 and to connect the combination across a source of medium voltage only, the normally open contacts 31 of the control relay being connected in series with the coil 29 and the combination being connected across a normal A.C. line, for example, of 115 volts. The medium-voltage source mentioned above may be for example the secondary 35 of a stepdown transformer 33 of which the primary 34 is also connected across the normal A.C. line.

In order to provide for the connection of the motor in shunt relationship to the arc path it is common to connect a motor circuit 40 from the welding conductor 19 (at a point on the arc side of the weld contactor relay contacts 28) to the welding conductor 18. This motor circuit conventionally comprises the conventional potentiometer 13 already mentioned, the upper end thereof being connected to the conductor 19 and the lower end thereof being connected, desirably through a fixed resistance 41, to the conductor 18. The conventional electrical connection of the motor would be simply from the movable contact 14 of the potentiometer 13, to the conductor 18. It will be understood that the function of the potentiometer 13 is to afford, by the adjustability of its movable contact 14, a control over that fraction of the arc voltage which will appear across the motor. Although, as will be later more fully apparent, our invention contemplates a connection of the motor not directly but through the medium or intermediary of a special potentiometric system, nevertheless that special system is preferably connected, as in its absence the motor would have been, from the movable contact 14 of the potentiometer to the conductor 18. Thus we retain the conventional control by contact 14 over that fraction of the normal arc voltage which will be impressed across the motor.

It will be appreciated that the arc or welding circuit must be completed by sequential closing of relay contacts 31 and relay contacts 28 before the arc can be struck, while on the other hand the feeding of the wire electrode 6 should not be instituted until the arc has struck. Accordingly, it is conventional to insert serially in the motor circuit the normally open contacts 43 of a motor relay 42, of which the coil 44 is serially inserted into the welding conductor 19. The coil 44 is of relatively few turns, and accordingly, the relay 42 is energized and the motor circuit thus completed only during the existence of the arc.

The use of the apparatus as thus described may be briefly reviewed as follows: In preparation for welding the primary 34 of the transformer 33 will be energized by connection to the A.C. line, and the source 20 will be placed in operation. The gun 1, with the wire electrode 6 extending slightly from the nozzle 3, will be manipulated to bring the tip of the wire electrode relatively near the work, and the trigger switch 11 will be closed by "squeezing" of the trigger 12 (and the flow of gas through the nozzle will be instituted); the trigger switch closure will result in sequential closing of relay contacts 31 and relay contacts 28, thus completing (other than at the arc path proper) the welding circuit. With the apparatus in this condition the tip of the wire electrode 6 will be brought into contact, typically a momentary "scratch" contact, against the work electrode W and upon the breaking of this contact the arc should strike. The flow of the arc current through the conductor 19 and thus through the coil 44 will cause a closure, quite prompt since the relay 42 may have relatively light contacts and may be of relatively low inertia, of the contacts 43, thus starting the rotation of the motor and thereby the feeding of the wire electrode. The desired welding may then be performed, the trigger switch being maintained closed as by appropriate finger pressure against the trigger 12. At the conclusion of such welding as is desired to be accomplished, and without removing the gun appreciably from the work, the trigger switch may be opened by release of the trigger 12; this will cause the sequential opening of contacts 31 and contacts 28 and thus the opening of the welding circuit and the extinguishment of the arc, though with a momentary delay due to the cumulative inertias of the relays 30 and 27 of which the latter in particular may be relatively sluggish.

With specific reference to the typical apparatus so described, the problems introductorily stated above may now be more precisely restated. With any source 20 which is characterized by appreciable inductance (as seen looking back into the source) a transient voltage will be developed between conductors 19 and 18 when, with the trigger switch 11 closed:

(a) a "scratch" contact between the wire and work electrodes 6 and W, effected in the effort to start the arc and which will of course have resulted in closure of the motor relay contacts 43, is broken without the arc in fact striking, or (b) the arc, already in progress, is lengthened abruptly by abrupt withdrawal of the gun to a greater distance from the work electrode W, or (c) the arc, again already in progress, is "snapped out" by any withdrawal of the gun to a distance from the work electrode W so great that the arc cannot be maintained.

It is of course true that either of the actions (a) and (c) will result in opening of the contacts 43 of relay 42, but the inevitable inertia of this relay precludes the opening of its contacts 43 from occurring soon enough to isolate the motor from the transient voltage thus developed between conductors 19 and 18.

Furthermore, and for the moment without regard to the inductive nature of the source 20 or to any transient development, there occurs a further exposure of the motor to over-voltage in the case of the use of a source 20 having a drooping voltage/current characteristic, as follows: Obviously in such a case the motor is most desirably designed for efficient operation at the voltage available to it when substantial arc current is flowing, for that is the condition of normal use for the intended purpose of the motor; relative to that voltage, the higher voltage available from the source and impressed on the motor when the current is reduced by any abnormal lengthening of the arc, or is cut off by either of the actions (a) and (c) set forth above, then represents an over-voltage which may be seriously harmful in itself.

Finally, and now again considering the inductive nature of the source and the transients shown above to be developed between the conductors 19 and 18 under various conditions, this over-voltage inherently provides a higher "base" value to which any of those transients will be additive.

In accordance with our invention we connect the motor 10 electrically in shunt relationship to the arc path— more specifically, from movable contact 14 of the conventional potentiometer 13 to the conductor 18 in order to retain the conventional control over that fraction of normal arc voltage which will appear across the motor— through the medium of a special potentiometric system designated in FIGURE 1 as 50. This system has two serially connected portions; one an impedance portion designated in that figure as 51 and the other a zener-diode portion designated in that figure as 52, and the motor 10 is connected in parallel with the zener diode portion 52 of the potentiometric system.

It will be convenient at this point to transfer attention from the potentiometric system shown in FIGURE 1 to that shown in FIGURE 4, which is a fractional schematic diagram intended for optional substitution for the corresponding portion of FIGURE 1, and in which the zener-diode portion of the potentiometric system, being of simplified variety, is designated as 52' and that system, being specifically different, is designated as 50'. In FIGURE 4 the zener-diode portion 52' consists of a single zener diode connected in the system in its reverse current direction, i.e., in a direction such that the current which the system undertakes to send through it is to the diode a reverse current, or in other words a current opposite in direction to the "forward" current which the diode relatively freely conducts. Most usually an arc welding apparatus of the type herein described is operated with a D.C. source (20) and with the work electrode W constituting the negative terminal, or cathode, of the arc (in welding parlance, is operated with "reverse" as distinguished from "straight" polarity), and under those circumstances the system of course undertakes to send through the zener-diode portion 52' in FIGURE 4 (or 52 in FIGURE 1) a current directed toward the conductor 18. In FIGURE 4 the zener diode is shown with an arrow directed away from that conductor 18, which indicates compliance with the specification as to reverse current direction just laid down.

As to current flow through it in its reverse current direction, a zener diode is characterized by an essentially infinite effective resistance at all voltages across it up to a critical voltage, but when this critical voltage is reached its effective resistance breaks down abruptly, and the zener diode then becomes essentially a constant voltage device. The breakdown is sometimes referred to as a "triggered avalanche" of carriers, both electrodes and holes, within the diode, and the zener diode itself is sometimes termed an "avalanche diode." The breakdown occurs within an infinitesimal time of the general order of only one microsecond.

Thus when the voltage between the conductors 19 and 18 is raised—whether gradually, or abruptly in the sense of result from an abrupt manipulation of the gun without arc extinguishment, or abruptly in the far more extreme sense of transient voltage development upon the breaking either of the welding circuit or the arc therein— through the breakdown voltage value characterizing the zener diode 52', the latter at the very instant whereat that voltage value is reached breaks down to an extremely low value of effective resistance. Connected, as shown in FIGURE 4, as a portion of a potentiometric system, the zener diode then has the effect, in the face of increasing voltage between the conductors 19 and 18, of limiting the voltage across itself for all practical purposes to its own breakdown voltage value, the entire excess of the interconductor voltage over this value being in effect diverted to, and appearing across and being absorbed by, the other or impedance portion 51' of the potentiometric system 50', which impedance portion appears in FIGURE 4 as a simple resistance.

The motor 10 being connected in parallel with the zener diode 52', the voltage limiting action of that diode of course extends to the voltage across the motor. Thereby there are achieved the objects of the invention of proofing the motor against the effects of all the improvident manipulations of the gun by the operator—more specifically, against damage by any of the voltage rises and transients—hereinabove discussed or, alternatively or additionally, of making possible the use of a more efficient, and thus more compact and lighter and less expensive, motor than would otherwise be required.

In a typical case there might be employed a source 20 yielding an open circuit output voltage of the order of 70 volts and having a drooping output voltage/current characteristic such that under conditions of most favorable welding current it yields an output voltage of the order of 25 to 30 volts; a motor 10 designed for efficient operation at a voltage of the order of 28 volts and in turn susceptible to damage from voltage across it of the order of 40 or more volts; and a zener diode 52' having a reverse current breakdown voltage of the order of 35 volts.

We intend no limitation as to the number of zener diodes to be employed in the zener diode portion of the potentiometric system. Thus, in the fractional FIGURE 5, intended for optional substitution in the apparatus of FIGURE 1 just as was FIGURE 4, we have shown a potentiometric system 50'' having as its impedance portion 51'' a simple resistance, and having a zener-diode portion 52'' consisting of two serially connected zener diodes 52a each connected in direction similar to that of the other (and to that of the diode 52' of FIGURE 4). This is, for example, a favorable arrangement in a case wherein there are involved source and motor parameters such as discussed in the preceding paragraph but wherein zener diodes having reverse current breakdown voltages of the order of 17½ volts, rather than 35 volts, are more readily available or wherein zener diodes having either order of breakdown voltage are available but, in the 35-volt breakdown voltage case, in insufficient current carrying capacity.

Although arc welding apparatus such as herein described is most usually operated with the work electrode constituting the cathode of the arc, i.e., with reverse polarity, there are cases in which it may be desirable to operate the apparatus with the work electrode constituting the anode, i.e., with straight polarity. To accommodate to this reversed basis of operation it is only necessary to reverse the direction of connection of the zener diode or diodes from that shown in FIGURE 4 or FIGURE 5, so that they stay in unchanged polarity relation to the terminals of the source 20.

It is important, however, to note that failure to make that reversal of direction of diode connection when operating the apparatus with the work electrode as an anode—more broadly, that any connecting, accidental or otherwise, to the welding machine of the rest of the apparatus, in which latter of course is the zener diode or diodes—in the welding polarity opposite to that for which the zener diode or diodes is or are connected therein, will result both in non-operation of the motor, and in the passage of an excessive and possibly damaging current through the impedance portion of the potentiometric system as well as through the upper portion of the conventional voltage-regulating potentiometer 13.

To proof the apparatus against such undesirable results of an improvidently reversed connection of the rest of the apparatus to the welding machine, our invention contemplates an elaborated embodiment wherein the zener-diode portion of the potentiometric system comprises one or more zener diodes connected in one direction, and in serial arrangement therewith one or more zener diodes connected in the other direction. A potentiometric system with such a zener-diode portion is inherently proofed as just outlined, for whichever happens to be the polarity of the voltage applied across it, the diode or diodes which happen to be connected in reverse current direction will provide the desired voltage limitation, while that or those connected oppositely, i.e., in forward current direction, will pass harmlessly and with negligible voltage drop whatever current is from time to time passed by the diode or diodes first mentioned. Such an arrangement is that shown in FIGURE 1, wherein the zener-diode portion 52 of the potentiometric system 50 comprises, by way of example, two serially arranged zener diodes 52a each connected in one direction and, in series therewith, two serially arranged zener diodes 52b each connected in the other direction.

In the FIGURE 1 embodiment the impedance portion 51 of the potentiometric system 50 may comprise a resistance 51a. This resistance may if desired be of suitable value so that it may form the sole component of the impedance portion 51. We have observed, however, that it may sometimes be useful to make that impedance portion a combined reactance, e.g., inductance, and resistance, and accordingly we have shown that portion as comprising also an inductance 51b in series with the resistance 51a. When both are present the resistance 51a may, for example, be only large enough to proof the motor against the effects of changes of operating point on the output voltage/current curve of the source 20, the reactance or inductance 51b then being relied on to proof the motor against transient voltages, which by the zener-diode portion 52 of the potentiometric system are effectively diverted to the impedance portion 51 as explained above.

With respect to the impedance portion 51 we may finally mention that in appropriate cases the resistance 51a might be omitted and the reactance or inductance 51b relied on as the entire impedance portion; appropriate cases would in general comprise ones (including a particular one about to be mentioned) wherein the function of the potentiometric system can warrantably be restricted to the proofing against transient voltages.

While our invention has a multiple utility in connection with a current source 20 which both is characterized by appreciable inductance and has a drooping output voltage/current characteristic, we intend no unnecessary limitation to such a current source. Thus, the source 20 may alternatively be one which, though characterized by appreciable inductance, no longer has the drooping characteristic but instead has a substantially flat output voltage/current characteristic, i.e., with increasing current maintains its output voltage essentially constant, or only slightly drooping or even slightly rising. With such a source our invention still has that very important aspect of utility which concerns proofing the motor against the effects of all the transients mentioned above. On the other hand the source 20 may still alternatively be one which, though not characterized by appreciable inductance, still has the drooping characteristic; with such a source our invention has the other important aspect of utility which concerns proofing the motor against voltage rises occasioned by shifting of the operating point along the output characteristic.

In arc welding apparatus of the type herein dealt with alternating current operation of the arc is not usually preferred, but may at times be desirable for special welding conditions or purposes. Of course in such a case the source 20 and the motor 10 of the FIGURE 1 embodiment would have to be of varieties appropriate to alternating current, and the relays would have to be operable by that form of current. We have observed, however, that the potentiometric system of FIGURE 1, with its zener diode or diodes 52a already arranged reversely to its zener diode or diodes 52b, is inherently adapted to perform its proofing functions in the case of alternating current operation, the impedance portion 51 comprising either the resistance 51a alone, or both it and the reactance or inductance 51b, or the latter alone (note being made that with the latter alone there would now be accomplished the impedance-portion functions both as to voltage rises occasioned by shift of operating point on the characteristic and as to transient voltages).

While we have disclosed our invention in terms of particular embodiments thereof, we intend no unnecessary limitations thereby. Modifications in many respects will be suggested by our disclosure to those skilled in the art, and such modifications will not necessarily constitute departures from the spirit of the invention or from its scope, which we undertake to define in the following claims.

We claim:

1. In arc welding apparatus of the type which includes a hand-manipulated gun out of which a wire electrode is fed to be projected onto a work electrode in minutely subdivided form in an arc between the electrodes, the combination of a source of current for the arc connectible to the electrodes, said source having an output voltage/current characteristic which droops with increasing current, an electric motor in the gun for feeding the wire electrode, and a circuit placing the motor electrically in shunt relationship to the arc path, said circuit comprising a potentiometric system which is connected in said shunt relationship and which comprises an impedance portion and a zener-diode portion in series with each other, said zener-diode portion comprising a zener diode connected in reverse-current direction and being characterized by a limiting voltage intermediate between the voltages respectively applied to said potentiometric system under open-circuit and under normal arcing conditions in the arc path, and the motor being electrically in parallel with said zener-diode portion.

2. In arc welding apparatus of the type which includes a hand-manipulated gun out of which a wire electrode is fed to be projected onto a work electrode in minutely subdivided form in an arc between the electrodes, the combination of a source of current for the arc connectible to the electrodes, said source having an output voltage/current characteristic which droops with increasing current, an electric motor in the gun for feeding the wire electrode, and a circuit placing the motor electrically in shunt relationship to the arc path, said circuit comprising manually adjustable means for deriving a voltage which is an adjustable fraction of the voltage across the arc path, and a potentiometric system across which said derived voltage is applied and which comprises an impedance portion and a zener-diode portion in series with each other, said zener-diode portion comprising a zener diode connected in reverse-current direction, and the motor being electrically in parallel with said zener-diode portion.

References Cited in the file of this patent

UNITED STATES PATENTS

| | | |
|---|---|---|
| 2,510,204 | Baird | June 6, 1950 |
| 2,789,254 | Bodle et al. | Apr. 16, 1957 |